Patented Aug. 11, 1931

1,818,213

UNITED STATES PATENT OFFICE

ALBERT K. EPSTEIN AND BENJAMIN R. HARRIS, OF CHICAGO, ILLINOIS

EGG WHITE PROCESS

No Drawing.   Application filed August 8, 1929. Serial No. 384,470.

Our invention relates to an improved dried egg white material, and the process for producing such material.

In our co-pending application Serial Number 384,469, filed August 8, 1929 (Case 27) we described a process for drying eggs which consisted primarily in controlling the ripening process to a point where the final product was alkaline to litmus. By means of this prior process a greatly improved product is obtained and we are interested in the present application in still further improving such product and utilizing a process which does not require as accurate control as the prior process described.

The invention has for its main object the production of an improved egg white product having good foaming qualities but avoiding putrefactive odors.

When liquid egg whites are allowed to ripen at ordinary temperatures and in the ordinary way a natural diminution in the fermentable carbohydrate material takes place with the concomittant increased production of acid. We have discovered that an improved product may be obtained by introducing additional quantities of carbohydrate material so that ripening takes place in the presence of ample fermentable carbohydrates and proteolysis takes place much slower and putrefaction is considerably delayed. At the same time during the process as a result of some enzymic action sufficient dispersion takes place to produce a substance with better foaming qualities than those of ordinary liquid egg whites with a better flavor and odor.

Our present process therefor consists in introducing into liquid egg white material a sufficient amount of carbohydrate material so that an abundance of fermentable carbohydrate material will be present during ripening. This effects a protein cleavage just sufficient to insure the foaming value but will prevent or reduce deep seated albumin decomposition which results in putrefaction.

As a specific example of our process we take fresh egg whites before the ripening thereof has been completed and add a sufficient amount of available carbohydrate such as sucrose, dextrose or their equivalents so that after ripening and drying there is always a substantial amount of carbohydrates left and whereby the final product is colloidally dispersed and has better foaming value.

As in our previous process the best results take place when the ripening is allowed to progress to a point where the product is neutral or slightly acid to phenolphthalein but not acid to litmus. We have found, however, that if ripening takes place in the presence of an abundance of sugar material it may be allowed to proceed further so that the final product may be slightly acid to litmus and still putrefaction may be avoided.

As to the amount and character of carbohydrate we have obtained very good results by using 10 pounds of sugar with 1000 pounds of liquid whites, incorporating the sugar slowly into the whites to prevent too much foaming. This is allowed to stand at ordinary temperature until the product becomes properly ripened preferably to a point where it is slightly acid to phenolphthalein at which point it is dried and further ripening arrested as an incident to the drying step.

What we claim as new and desire to protect by United States Letters Patent is:

1. A process for producing improved dried egg whites which includes introducing fermentable carbohydrate material into liquid egg whites, ripening the resulting product and finally extracting the moisture therefrom.

2. A process for producing improved dried egg whites which includes introducing a relatively small amount of carbohydrate material into liquid egg whites, aging the resulting product to ripen the same and drying the same before the ripening has progressed to such a point as to cause the finished dried product to be substantially acid to litmus.

3. A process for producing improved dried egg whites which includes introducing a relatively small amount of fermentable carbohydrate material into unripened liquid egg whites, ripening the resulting product and drying the same to arrest the ripening process while there is still a substantial percentage of fermentable carbohydrate material present.

4. A process for producing improved dried egg whites which includes introducing a relatively small amount of fermentable carbohydrate material into unripened liquid egg whites, ripening the resulting product to a point where it is acid to phenolphthalein, and finally drying the product before it becomes acid to litmus.

In witness whereof we hereunto subscribe our names this 5th day of July, 1929.

ALBERT K. EPSTEIN.
BENJAMIN R. HARRIS.